US012620215B1

(12) United States Patent
Liu et al.

(10) Patent No.: US 12,620,215 B1
(45) Date of Patent: May 5, 2026

(54) SYSTEMS AND METHODS FOR DEEP LEARNING-BASED IMAGE AND VIDEO MODIFICATIONS

(71) Applicant: Amazon Technologies, Inc., Seattle, WA (US)

(72) Inventors: Oliver Dayun Liu, Irvine, CA (US); Wenbin Ouyang, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 446 days.

(21) Appl. No.: 18/188,799

(22) Filed: Mar. 23, 2023

(51) Int. Cl.
*G06V 10/82* (2022.01)
*G06T 3/4046* (2024.01)
*G06V 10/75* (2022.01)
*G06V 10/764* (2022.01)

(52) U.S. Cl.
CPC ............ *G06V 10/82* (2022.01); *G06T 3/4046* (2013.01); *G06V 10/751* (2022.01); *G06V 10/764* (2022.01)

(58) Field of Classification Search
CPC .... G06V 10/82; G06V 10/751; G06V 10/764; G06T 3/4046
See application file for complete search history.

(56) References Cited

U.S. PATENT DOCUMENTS

| | | | | |
|---|---|---|---|---|
| 2017/0347110 A1* | 11/2017 | Wang | ...................... | H04N 19/80 |
| 2020/0349681 A1* | 11/2020 | Andrei | .................. | G06N 3/088 |
| 2021/0097646 A1* | 4/2021 | Choi | ...................... | G06T 3/4053 |
| 2022/0108421 A1* | 4/2022 | Shacklett | .............. | G06T 3/4046 |
| 2023/0306739 A1* | 9/2023 | Yu | ............................ | G06V 10/82 |
| 2024/0104912 A1* | 3/2024 | Kim | ........................ | G06V 10/87 |
| 2024/0153033 A1* | 5/2024 | Wang | ................... | H04N 19/103 |

* cited by examiner

*Primary Examiner* — Jennifer Mehmood
*Assistant Examiner* — Vaisali Rao Koppolu
(74) *Attorney, Agent, or Firm* — Eversheds Sutherland (US) LLP

(57) ABSTRACT

Systems and methods for deep learning-based image and video modifications are provided. Particularly, a combination of two different neural networks may be used to perform a modification to existing image and/or video content (for example, increasing the resolution of an older video). The original image and/or video content may be provided to the first neural network, which may extract information about the image and/or frames of the video content. This information may then be provided to a second neural network, which may use the information to produce the modified image and/or video content.

20 Claims, 8 Drawing Sheets

200

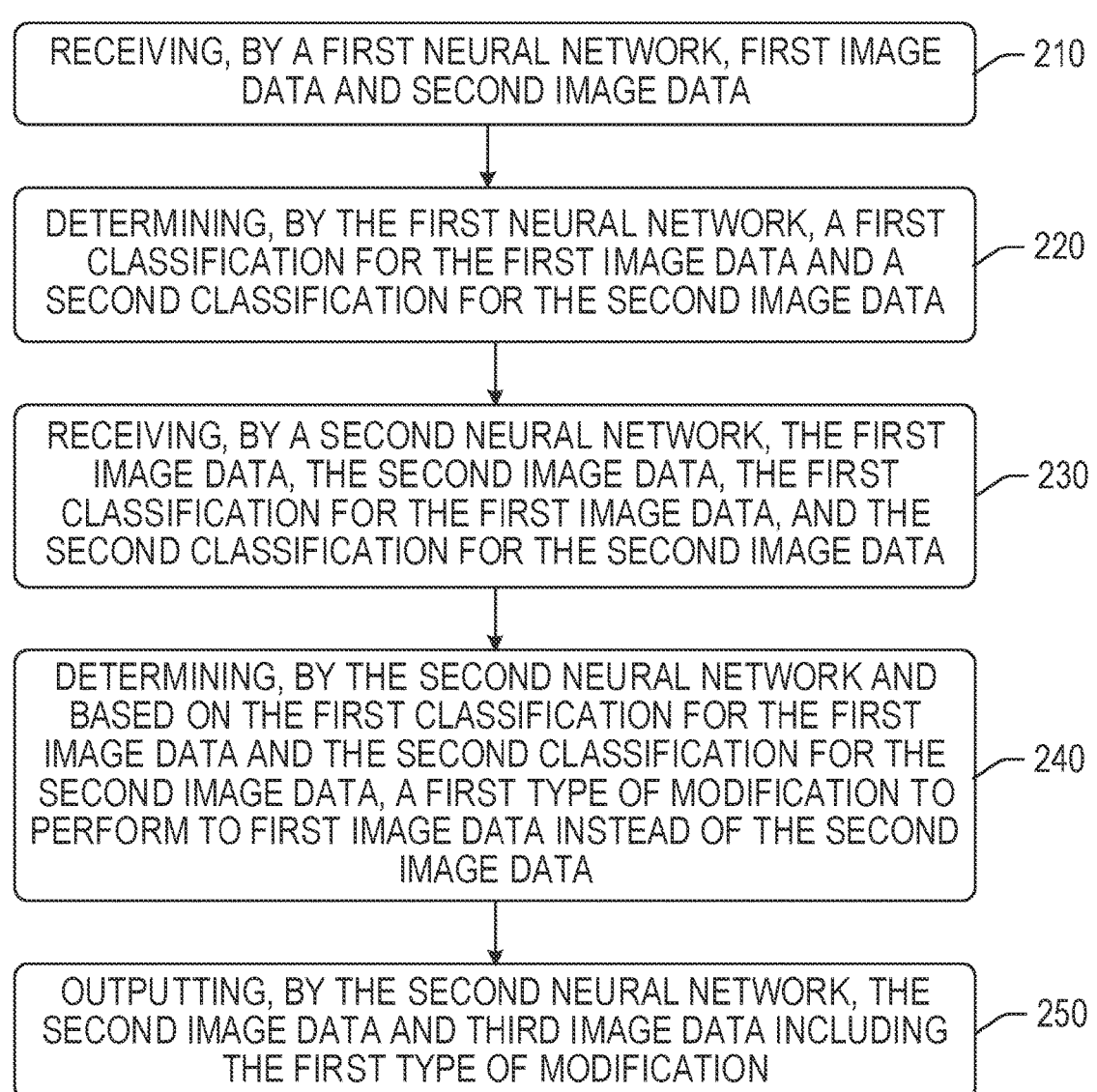

RECEIVING, BY A FIRST NEURAL NETWORK, FIRST IMAGE DATA AND SECOND IMAGE DATA — 210

DETERMINING, BY THE FIRST NEURAL NETWORK, A FIRST CLASSIFICATION FOR THE FIRST IMAGE DATA AND A SECOND CLASSIFICATION FOR THE SECOND IMAGE DATA — 220

RECEIVING, BY A SECOND NEURAL NETWORK, THE FIRST IMAGE DATA, THE SECOND IMAGE DATA, THE FIRST CLASSIFICATION FOR THE FIRST IMAGE DATA, AND THE SECOND CLASSIFICATION FOR THE SECOND IMAGE DATA — 230

DETERMINING, BY THE SECOND NEURAL NETWORK AND BASED ON THE FIRST CLASSIFICATION FOR THE FIRST IMAGE DATA AND THE SECOND CLASSIFICATION FOR THE SECOND IMAGE DATA, A FIRST TYPE OF MODIFICATION TO PERFORM TO FIRST IMAGE DATA INSTEAD OF THE SECOND IMAGE DATA — 240

OUTPUTTING, BY THE SECOND NEURAL NETWORK, THE SECOND IMAGE DATA AND THIRD IMAGE DATA INCLUDING THE FIRST TYPE OF MODIFICATION — 250

FIG. 2

SYSTEMS AND METHODS FOR DEEP LEARNING-BASED IMAGE AND VIDEO MODIFICATIONS

BACKGROUND

In the film industry, visual effects have undergone a drastic change as a result of advancements in computer vision and rendering algorithms. Computer-generated imagery (CGI) has become increasingly realistic over the years. A major roadblock currently associated with CGI, however, is rendering time. As the visual effects used in movies have become increasingly complex, the time required to render the visual effects has also significantly increased. It is not uncommon for the rendering of visual effects shots to take days to complete. This is even more problematic for movies that are rendered at higher resolutions, such as 4k. For example, typically, a visual effects scene at a 4k resolution may take 20 times as long to render than the same scene at a 2k resolution, while occupying an incredible amount of power and hardware resources in the process.

One partial solution to this problem is to utilize technology advancements in the area of super-resolution. For example, scenes may be rendered at a lower resolution (for example, 2k) and the scenes may then be upscaled to a greater resolution (for example, 4k). This upscaling process may save rendering time while maintaining the same level of quality as if the content was originally rendered in 4k.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may depending on the context, encompass a plural number of such components or elements and vice versa.

FIG. 2 is an example method for deep learning-based image and video modifications in accordance with one or more example embodiments of the disclosure.

DETAILED DESCRIPTION

Figure 1:
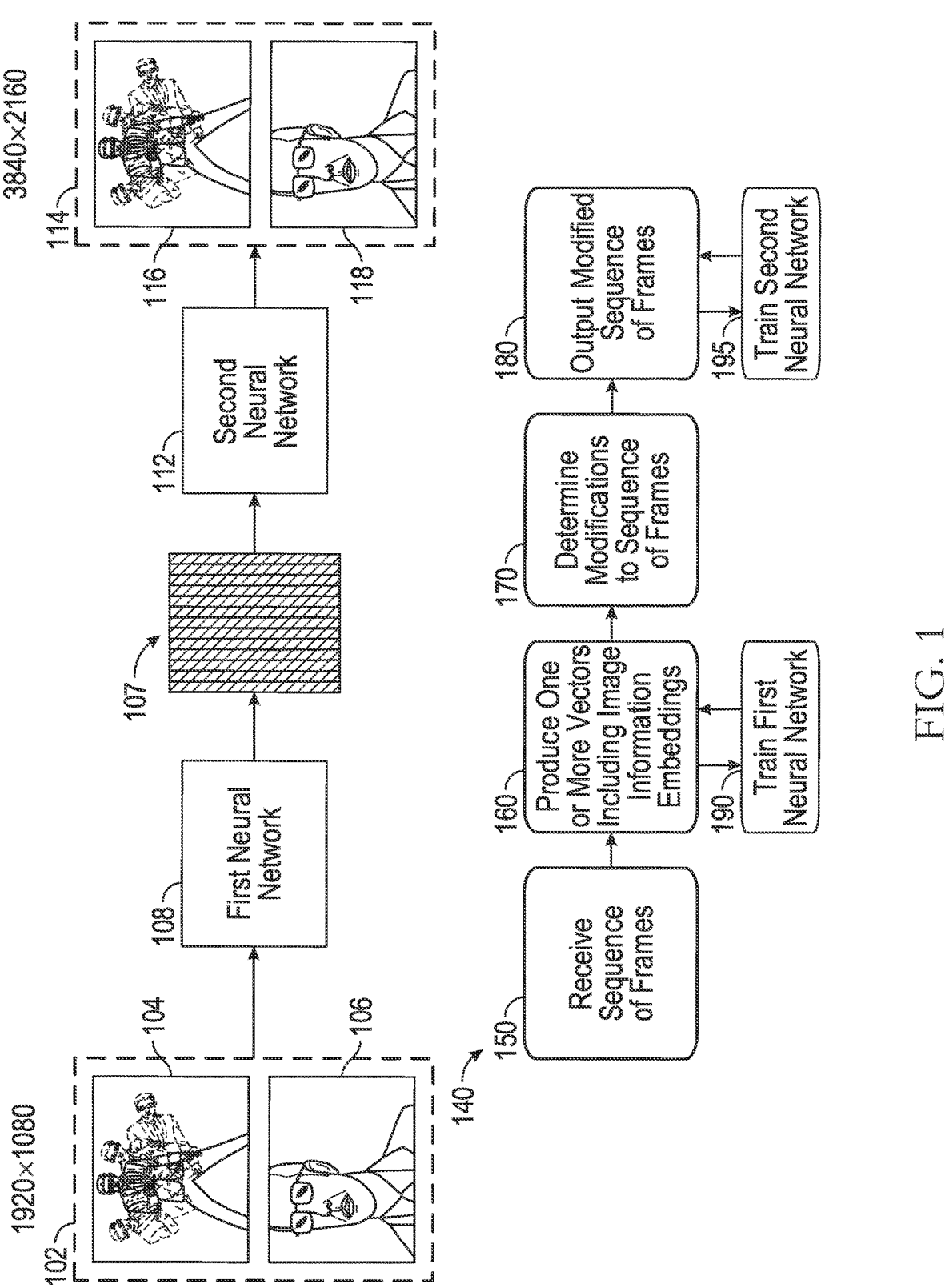
FIG. 1 is an example use case for deep learning-based image and video modifications in accordance with one or more example embodiments of the disclosure.

This disclosure relates to, among other things, systems and methods for deep learning-based image and video modifications. Particularly, the systems and methods may involve the use of two neural networks to produce modified image and/or video content. As a non-limiting example, a sequence of frames associated with a movie that was originally rendered at a lower resolution may be provided as an input to one or more neural networks and the output of the one or more neural networks may be an upscaled version of the movie that is at a higher resolution.

In addition to performing modifications to the image and/or video content, the systems and methods described herein are advantageous over conventional methods for modifying image and/or video content by selectively performing modifications or different types of modifications to certain portions of the images and/or video content based on characteristics of those portions of the images and/or video content. As an example, it may not be desired for all frames of a piece of video content to be modified to the same increased resolution. For example, some scenes in movies contain motion blur resulting from rapid character motions and some scenes are intentionally blurry to depict the dazed vision of a character that is waking up from sleep. For frames including these example characteristics, increasing the resolution may only cause the frames to become overly sharp and remove the intended effect of the blurring in the frames. In addition, some super-resolution networks may be designed to operate on images rather than videos, and thus the degree to which these networks enhance the image often varies across consecutive frames, causing some frames to become blurrier than neighboring frames.

To account for these considerations, in one or more embodiments, the one or more neural networks may include a first neural network, such as an image condition determination network that produces an output that is received as an input by a second neural network, such as a conditional generative adversarial network (GAN). The image condition determination network may receive as an input a sequence of frames of a video (or a single image) and may output a number of vectors that provide information about various characteristics of the frames. A vector may be a type of one-dimensional array including any number of different types of information. While reference is made to a "vector" and "vectors" herein, any other type of data storage mechanism may also be used. In some instances, the number of vectors produced may be equal to the number of frames in the sequence of frames.

In one or more embodiments, the information may be provided in "image condition embeddings," which may simply refer to data that is provided within the vectors relating to determined characteristics of the image or individual frames of video content. For example, the information may include whether certain frames or combinations of frames include intentional blurriness, such as motion-blur, whether certain frames include varied levels of transparency (e.g., a character in a frame is being shown behind a transparent mirror), whether certain frames include special particle effects (e.g., smoke, fire, etc.), whether a frame should be upscaled in resolution (e.g., whether the resolution of the frame should be increased), a specific increase in resolution associated with the upscale, whether certain frames require photo recovery, etc. In some cases, the image condition determination network may include a transformer module so that self-attention modules may utilize temporal information to perform accurate processing. An example of the image condition determination network is shown in at least FIGS. 2 and 5.

The conditional GAN may receive inputs including the sequence of frames provided to the image condition determination network as well as the vectors produced by the image condition determination network. The conditional GAN may use the vectors produced by the image condition determination network to produce an output including a modified set of frames for the video (or a modified image if the input to the first neural network is an image). Based on the information included within the vectors, the conditional GAN learns which types of modifications to perform to individual frames in the sequence of frames. For example, the conditional GAN learns to upscale frames that are not transparent, do not include motion-blur, and do not include particle effects, while leaving frames unmodified (or only partially modified) if they do include such conditions. These are merely exemplary determinations that may be made by the conditional GAN based on the information included in the vectors and is not intended to be limiting. An illustration of a conditional GAN is shown in at least FIGS. 3 and 5.

The one or more neural networks as described herein may be used to perform a number of different types of image and/or video modifications. One example involves performing resolution upscaling and color-correction on existing movies to provide higher-quality versions of the movies (for example, increasing a resolution from 2k to 4k, producing more vibrant colors in the movie, etc.). Visual effects artists may render scenes at lower resolutions to save time and computation resources. Asset artists may create scene background images rapidly and use photo recovery to recycle and reapply old assets. Directors may use the image condition determination network to determine if the quality of a shot meets a quality threshold or if it the shot needs to be re-taken. Editors may use the photo recovery function to automatically correct color problems in scenes.

The one or more neural networks may also be used to perform any other types of image and/or video content modifications. For example, the one or more neural networks may be used to manipulate darkness or brightness levels of the video, perform interpolation, perform object editing (for example, add, remove, or modify existing objects within the image and/or video), adjust the sharpness of an image or video, adjust the speed of transitions included within a video (for example, by increasing or decreasing the amount of blurriness present in adjacent frames in a video), and/or any other number or modifications.

Referring to FIG. 1, an example use case 100 for deep learning-based image and video modifications is depicted in accordance with one or more example embodiments of the disclosure. For example, the use case 100 may illustrate the two neural networks (for example, the first neural network 108 and the second neural network 112) used to perform one or more modifications to an image or video content. However, this is not intended to be limiting, and any other number of neural networks may similarly be used. While reference is made herein to the use of a first neural network 108 and a second neural network 112, this is not intended to be limiting and any other number of neural networks may also be used. Additionally, while reference is made herein to neural networks, any other suitable type of artificial intelligence, machine learning, and the like may also be used.

The use case 100 shows an example sequence of frames 102 including a first frame 104 and a second frame 106. The sequence of frames 102 may be individual frames that together form a video or a portion of a video, such as a movie, for example. Although the example sequence of frames 102 only includes two individual frames, this is merely for illustrative purposes. The first frame 104 depicts an image of a character that is moving quickly within the scene, which is represented by blurred copies of the character within the first frame 104. The second frame 106 is a still image of the character standing within the scene, thus the second frame 106 does not include the same blurred elements.

The sequence of frames 102 is provided as an input to the first neural network 108, which may be the aforementioned image condition determination network. The first neural network 108 processes the first frame 104 and the second frame 106 (additional details about some of the specific processing that is performed is provided in FIG. 5) and produces one or more vectors 107 as an output. The one or more vectors 107 include information about the first frame 104 and the second frame 106 that may then be used by the second neural network 112 to perform any desired modifications to the first frame 104 and the second frame 106. For example, the one or more vectors may include a first vector including information about the first frame 104 and a second vector including information about the second frame 106. In this particular use case 100, the one or more vectors 107 may indicate that the first frame includes intentionally blurry elements, such as the blurred copies of the character in the scene. This information may be useful because it may be undesirable to upscale the resolution of an intentionally blurry element in a frame, which may eliminate the intended effect of the blur, such as the character appearing to move quickly within the scene.

The second neural network 112, which may be the aforementioned conditional GAN, may receive as inputs the one or more vectors 107 and the sequence of frames 102 that was originally provided to the first neural network 108. Based on the information included in the one or more vectors 107, the second neural network 112 may modify the first frame 104 and the second frame 106 to produce an output sequence of frames 114, including a modified first frame 116 and a modified second frame 118. In the use case 100, the modified second frame 118 has a larger resolution compared to the second frame 106 (for example, the modified second frame 118 has a resolution of 3840×2160 compared to the 1920× 1080 resolution of the second frame 106). The modified first frame 116, however, may not be fully modified to the resolution of the modified second frame 118. For example, it may not necessarily be desirable to modify the pixels associated with the blurred versions of the character to maintain the appearance of the character moving in slow motion. Thus, the second neural network 112 may only modify certain portions of the modified first frame 116 or may leave the modified first frame 116 the same resolution as the first frame 104.

To perform the deep learning-based image and/or video content modifications, an example process flow 140 is presented and may be performed, for example, by one or more computing systems or devices (for example, mobile device 602, remote system 620, etc.). The one or more computing systems or devices may include at least one memory that stores computer-executable instructions and at least one processor configured to access the at least one memory and execute the computer-executable instructions to perform various actions or operations, such as one or more of the operations in the process flow 140 of FIG. 1. The process flow 140 is merely intended to provide a high-level example of the use of the first neural network 108 and the second neural network 112 and is not intended to be limiting in any way.

First block 150 may involve receiving a sequence of frames (for example, the sequence of frames 102). As aforementioned, the sequence of frames may be received by the first neural network 108. The sequence of frames may include any number of different frames that together form video content or a portion of the video content (for example, a movie, etc.). That is, the combination of neural networks (such as the first neural network 108 and the second neural network 112) as described herein may be used to modify all or some of the video content. However, this is not intended to be limiting and an image may also be received as an input to the first neural network as well. For example, in addition to modifying video content, the neural networks may also be used to perform a modification to a single image, such as digital photo restoration.

Second block 160 may involve producing, by the first neural network, one or more vectors including image information embeddings. The image information embeddings may indicate any number of different characteristics of the different frames (e.g., the first frame 104 and the second frame 106) of the sequence of frames 102 as described herein. This information may be provided to the second neural network along with the original sequence of frames 102 provided to the first neural network 108. The second neural network 112 may then determine modifications to perform to the first frame 104 and the second frame 106 based on the information in the one or more vectors. For example, in the use case 100, the modified second frame 118 may be a high-resolution version of the second frame. However, the same resolution upscaling may not necessarily be applied to the first frame 104 given the intentional motion blur existing in the frame.

Third block 170 may involve determining modifications to the sequence of frames. Fourth Block 180 may involve outputting a modified sequence of frames 114. The modified sequence of frames 114 may include the modified variants of the original frames received by the first neural network 108. For example, in the use case 100, the first frame 104 is modified to produce a modified first frame 116 and the second frame 106 is modified to produce a modified second frame 118. However, in some cases, not all of the frames of a sequence of frames may necessarily be modified and different modifications may be performed to different frames.

Additionally, to further improve the effectiveness of the first neural network 108 in producing accurate image information embeddings and the second neural network 112 in producing accurately modified image and/or video content, these neural networks may be trained using one or more different loss functions. For example, fifth block 190 may involve training the first neural network 108 and sixth block 195 may involve training the second neural network 112. In one or more embodiments, the training of the neural network 108 may involve comparing the one or more vectors produced by the first neural network 108 to ground truth data (for example, manually-determined image condition embeddings associated with the input sequence of frames 102). Likewise, the training of the second neural network 112 may involve comparing the modified image and/or video content to ground truth data as well. Further details about these loss functions is provided with respect to FIGS. 5A-5B.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

FIG. 2 depicts an example process flow 200 for deep learning-based image and video modifications in accordance with one or more example embodiments of the disclosure. While reference may be made to "image data," an "image," a "video," etc., this is not intended to be limiting. For example, image data may refer to a single image, a frame of a video, multiple frames of a video, etc. Additionally, any reference to an image may likewise be applicable to a video and any reference to a video may likewise be applicable to an image.

At block 210 of the process flow 200, computer-executable instructions stored on a memory of a system or device, such as mobile device 602, remote system 620, computing device 700, etc., may be executed to receive, by a first neural network, first image data and second image data. In one or more embodiments, the first image data and the second image data may be two frames of a video. The use of the two frames is merely exemplary and any other number of video frames may also be provided as an input in the form of a sequence of frames (a portion of a video or a whole video). Additionally, in some cases, the first neural network may instead receive a single image as an input (for example, if an image is being modified using the systems and methods described herein rather than a video). The first neural network may be the "image condition determination network" shown in at least FIGS. 3 and 5. The first neural network may be trained (for example, based on one or more loss functions shown in FIGS. 5A-5B) to determine information about the first image data and the second image data and produce one or more vectors including such information (the information may also be referred to as "image condition embeddings" or the like herein).

At block 220 of the process flow 200, the computer-executable instructions may be executed to determine, by the first neural network, a first classification for the first image data and a second classification for the second image data. The first classification may include, for example one or more of the image condition embeddings. These may include any number of different types of information about the first image data and the second image data, such as whether the first image data and/or second image data include intentional blurriness, such as motion-blur, whether first image data and/or second image data include varied levels of transparency (e.g., a character in a frame is being shown behind a transparent mirror), whether first image data and/or second image data include special particle effects (e.g., smoke, fire, etc.), whether first image data and/or second image data should be upscaled in resolution, an increase in resolution associated with the upscale, whether first image data and/or second image data require photo recovery, etc. The information may also include any other relevant information associated with the first image data and second image data, such as objects included in the first image data and second image data, as one additional non-limiting example.

At block 230 of the process flow 200, the computer-executable instructions may be executed to receive, by a second neural network, the first image data, the second image data, the first classification for the first image data, and the second classification for the second image data. The second neural network may be the "conditional GAN" shown in at least FIGS. 4 and 5. The second neural network may be trained (for example, based on one or more loss functions shown in FIGS. 5A-5B) to perform any modifications to the first image data and second image data (and/or any other number of images, video frames, etc.).

At block 240 of the process flow 200, the computer-executable instructions may be executed to determine, by the second neural network and based on the first classification for the first image data and the second classification for the second image data, a first type of modification to perform to first image data instead of the second image data. As one non-limiting example, the first classification for the first image data may indicate that an increase in resolution may be performed for the first image data. However, the second classification for the second image data may indicate that the second image data includes intentional blurriness. Thus, the second neural network may either not make any resolution modifications to the second image data or may only modify a portion of the second image data. Any other modifications may be made to either the first image data or the second image data as well.

At block 250 of the process flow 200, the computer-executable instructions may be executed to output, by the second neural network, the second image data and third image data including the first type of modification.

Figure 3:
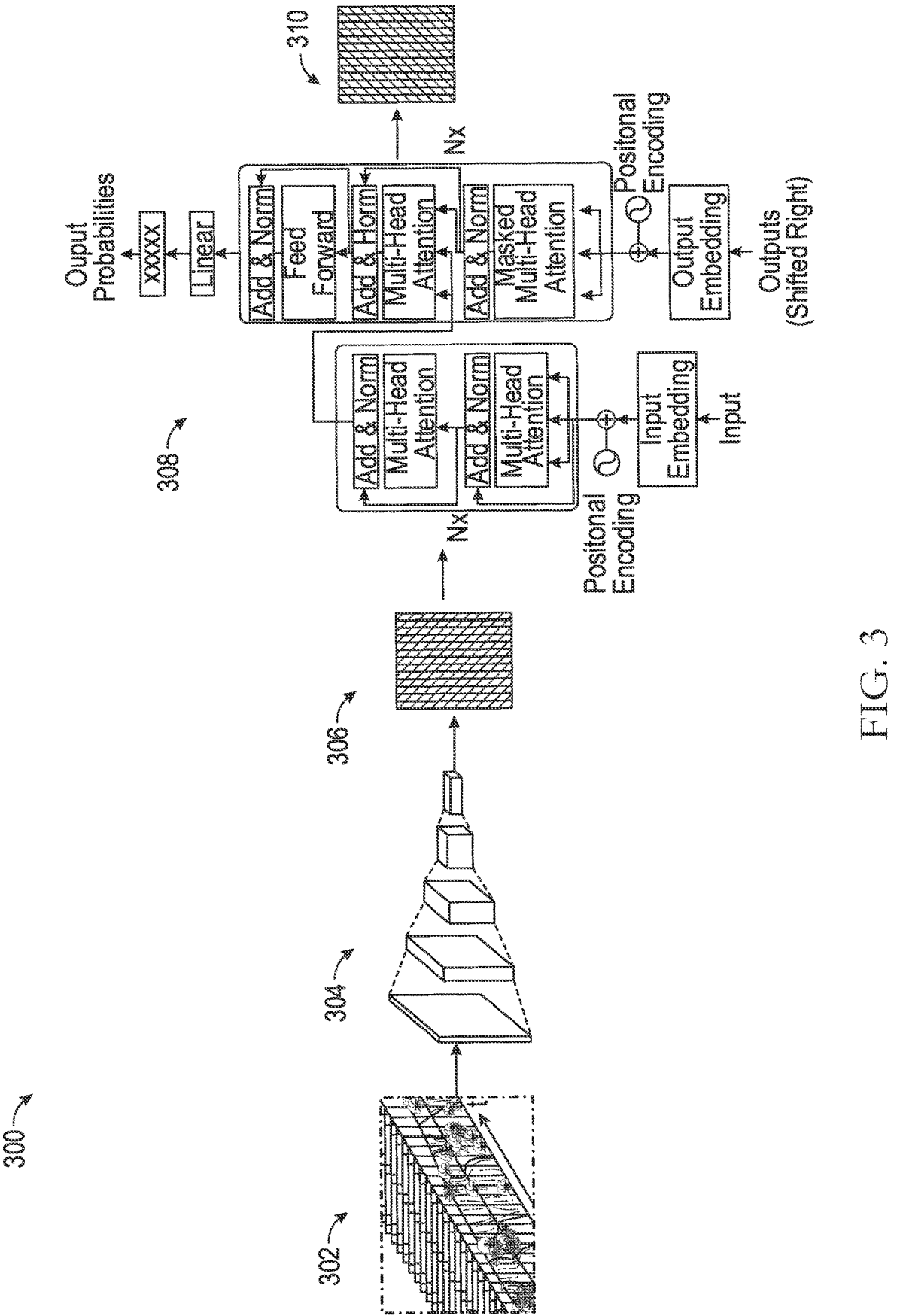
FIG. 3 is a flow diagram illustrating example operations associated with a first neural network in accordance with one or more example embodiments of the disclosure.

FIG. 3 is a flow diagram 300 illustrating example operations associated with a first neural network (for example, the first neural network 108 of the use case 100) in accordance with one or more example embodiments of the disclosure.

Operation 302 involves receiving a sequence of frames (also generally referred to elsewhere herein as "input frames"). The sequence of frames may include a number of individual frames that together form a video or a portion of a video, such as a movie, for example. Operation 304 involves performing one or more convolution operations on the sequence of frames. The convolution operations may serve as an encoding process to extract semantic meaning from the individual frames included within the sequence of frames. Operation 306 involves creating one or more latent vectors for the sequence of frames. The latent vectors may be vectors including information that is extracted from the individual frames of the sequence of frames based on convolution operations. For example, the information may include general semantic information, such as objects included within a frame, features included within a frame, such as a curve in a top right hand corner of a frame, etc. In some instances, the information in the latent vectors may be "raw" data that may then be converted by the transformer into data that may be used to perform modifications to the frames. In one or more embodiments, latent vectors may be created for individual frames, however, this is not intended to be limiting and any other number of latent vectors may also be created.

Operation 308 involves providing the one or more latent vectors 306 and the sequence of frames to a transformer. A transformer is a deep learning model that uses the mechanism of attention, differentially weighing the significance of different parts of the input data. Transformers may include multiple self-attention layers. For example, the transformer may be a vision transformer (ViT) and/or any other suitable type of transformer used to process image and/or video data.

Figure 4:
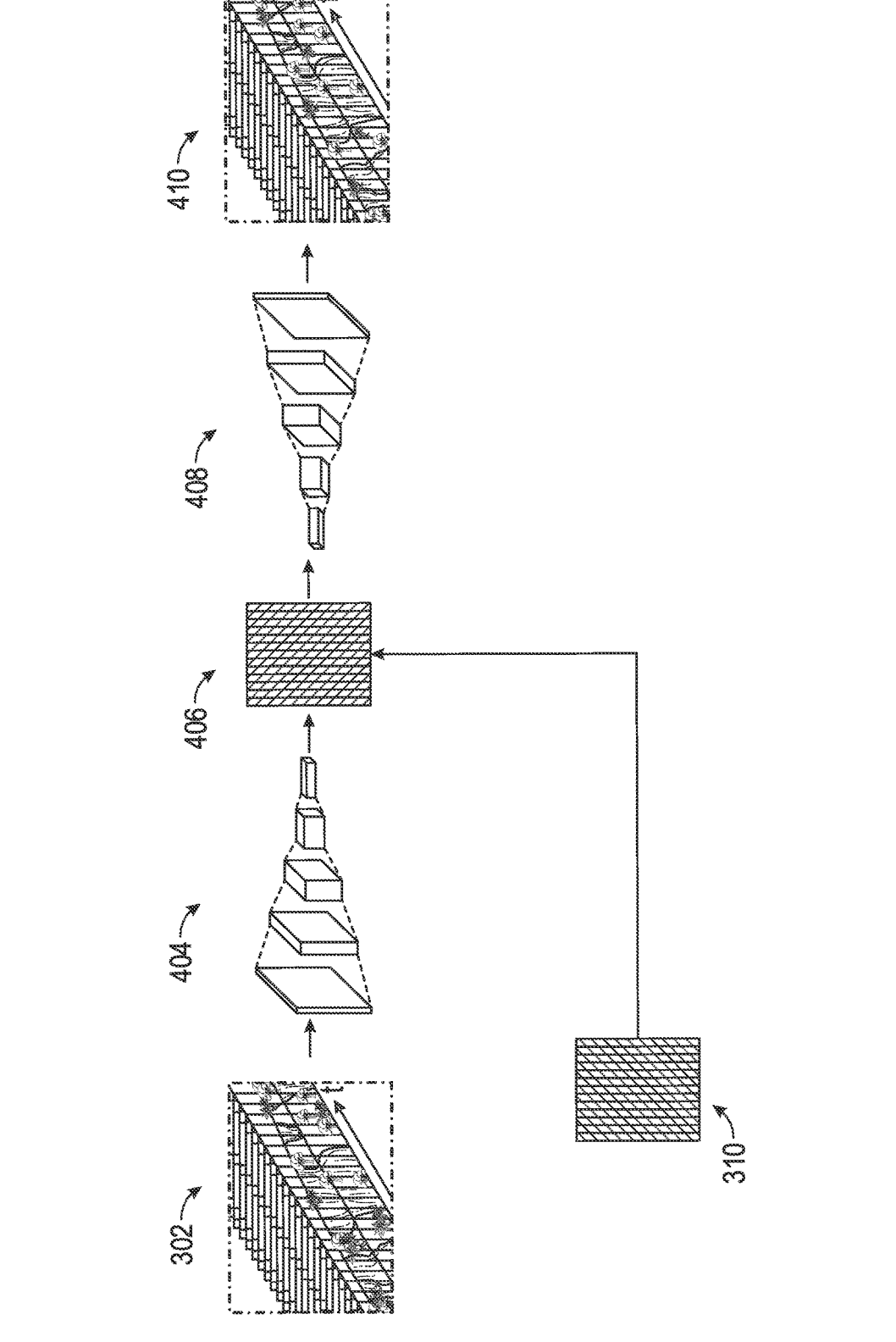
FIG. 4 is a flow diagram illustrating example operations associated with a second neural network in accordance with one or more example embodiments of the disclosure.

ViT may represent an input image as a series of image patches and predicts class labels for the image. It should be noted that while FIGS. 3-5 illustrate the use of a transformer, this is not intended to be limiting and a convolutional neural network (CNN) and/or any other type of neural network, artificial intelligence, machine learning, etc. may be employed as well. Additionally, reference to ViT is also merely exemplary and any other type of transformer may also be used as well.

Operation 310 involves producing, by the transformer, an output including one or more output vectors. In one or more embodiments, output vectors may be created for individual frames, however, this is not intended to be limiting and any other number of output vectors may also be created. The one or more output vectors may include image condition embeddings including information relating to various frames of the sequence of frames. The information may include any relevant information that may then be used by the second neural network to produce modified frames. For example, the information may include whether certain frames or combinations of frames include intentional blurriness, such as motion-blur, whether certain frames include varied level of transparency (e.g., a character in a frame is being shown behind a transparent mirror), whether certain frames include special particle effects (e.g., smoke, fire, etc.), whether a frame should be upscaled in resolution, an increase in resolution associated with the upscale, whether certain frames require photo recovery, etc. That is, the transformer may receive the raw information included in the latent vectors that is extracted by the convolution operations and converts this raw data into a different form that has assigned meaning relevant to the modification of the sequence of frames as described herein. This assigned meaning may be determined based on training of the transformer using the ground truth data. For example, the transformer may use one portion of the raw data in the latent vectors to determine that a particular frame includes a particle effect.

FIG. 4 is a flow diagram 400 illustrating example operations associated with a second neural network in accordance with one or more example embodiments of the disclosure.

Operation 402 involves receiving, by the second neural network the sequence of frames 302 received by the first neural network that produced the one or more output vectors 310 shown in FIG. 3. Operation 404 involves performing concatenation. That is, a series of convolutions may be performed to extract raw data, such as semantic data, from the sequence of frames 302. At operation 406, a series of latent vectors may be output including the raw data extracted from the sequence of frames 302 based on operation 404. The one or more output vectors 310 from the first neural network shown in FIG. 3 may be used to modify the content of the latent vectors 406. That is, the raw data in the latent vectors 406 may be modified into the information that is assigned meaning as determined by the first neural network shown in FIG. 3. Operation 408 involves performing a series of de-convolution operations to re-create some or all of the original sequence of frames 302. A final sequence of frames may then be output at operation 410.

Figure 5A:
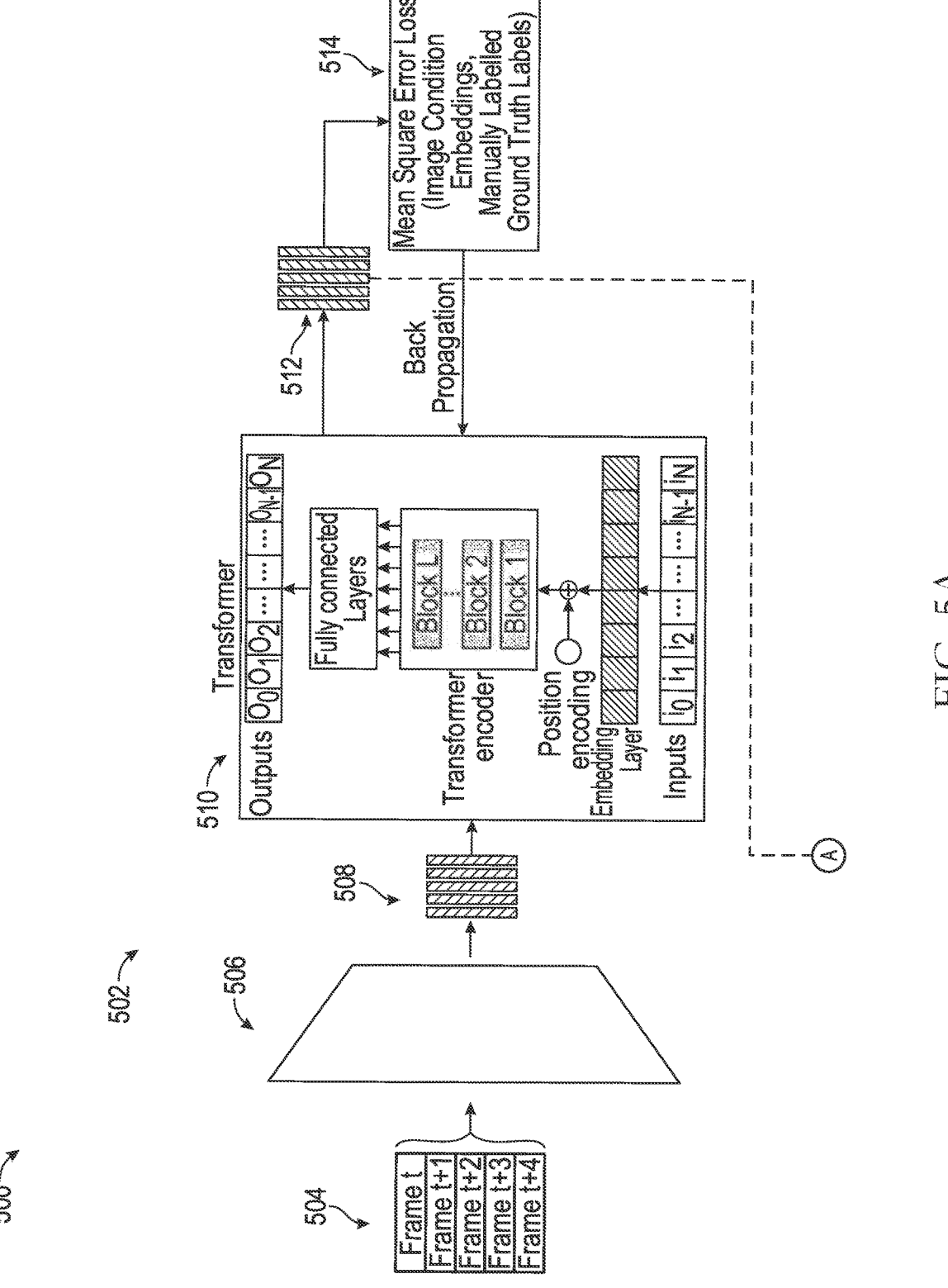
FIGS. 5A-5B is a flow diagram illustrating example operations associated with a combination of the first neural network of FIG. 3 and the second neural network of FIG. 4 in accordance with one or more example embodiments of the disclosure.
Figure 5B:
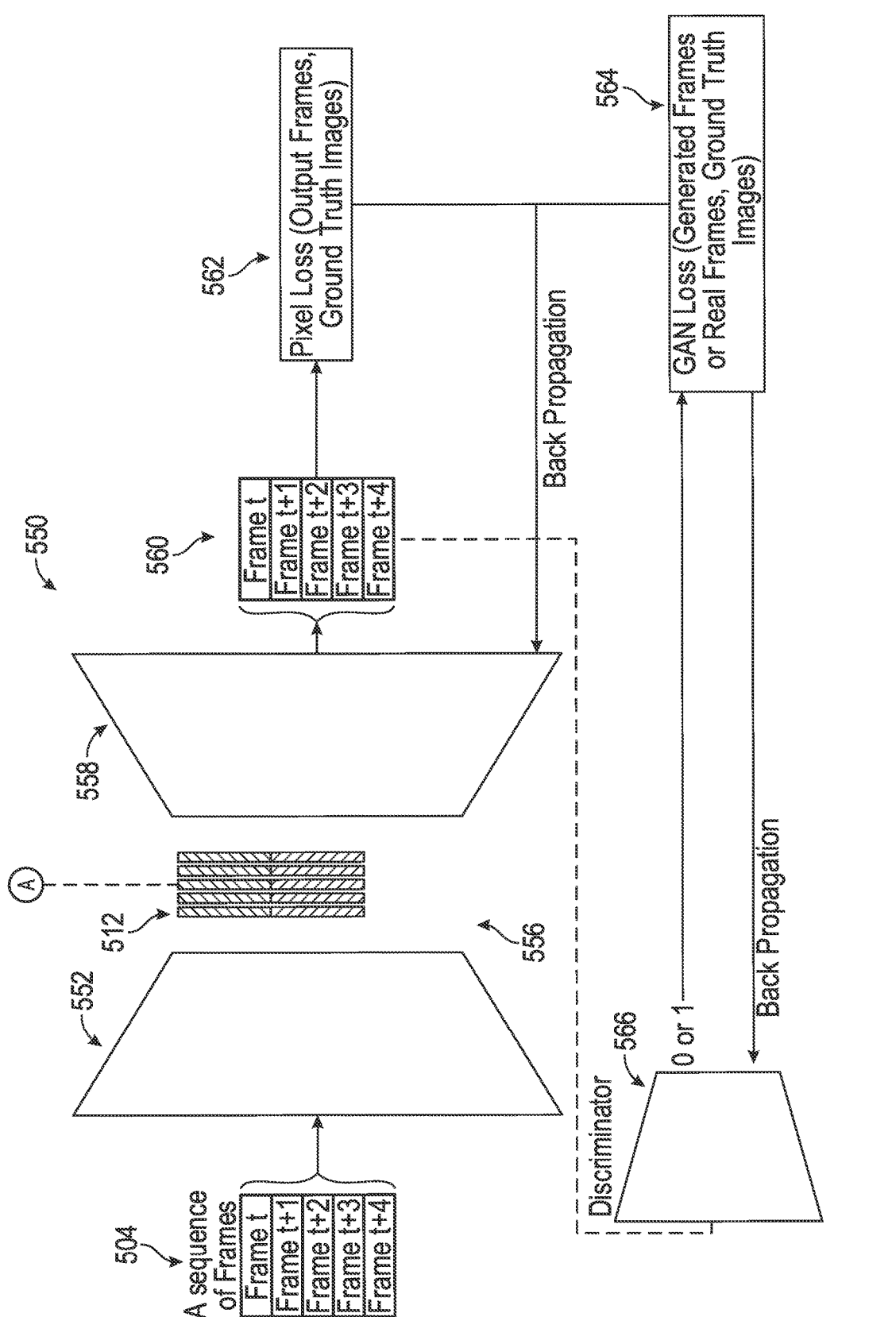

FIGS. 5A-5B is a flow diagram 500 illustrating example operations associated with a combination of the first neural network of FIG. 3 and the second neural network of FIG. 4 in accordance with one or more example embodiments of the disclosure. For example, first neural network 502 of the flow diagram 500 may be associated with the first neural network 300 and second neural network 550 of the flow diagram 500 may be associated with second neural network 400.

Similar to the flow diagram 300 of FIG. 3, the portion of the flow diagram 500 including the first neural network 502 illustrates a sequence of frames 504 being provided as an input to an encoder 506. The encoder may include a series of convolutional layers if a convolutional neural network is used or may include transformer blocks if a transformer (such as a vision transformer, for example) is being used. The encoder may output one or more latent vectors 508 associated with the frames included within the sequence of frames 504. An encoder may generally refer to a portion of a transformer architecture that may be used to extract features from the data that is received. In this manner, the data may be broken down into feature components that may allow the data to be processed by the transformer.

At a high level, a video encoder may break down a frame of a series of frames included in video data (for example, the sequence of frames 504) into video embeddings. The video embeddings may include one or more different types of tokens, for example. Each video token may include a "patch" of pixels from the frame. For example, if a frame comprises 224×224 pixels, then a collection of 16×16 patches may be extracted as tokens. The number of patches increases as frame resolution increases, which results in greater memory usage. Each token may be associated with a corresponding "positional embedding," which may identify the position of the token in the sequence of tokens. This is one aspect of a transformer model that allows for an improved understanding of relationships in sequential data. Additionally, a classification (CLS) token may be associated with a series of tokens. The CLS token may serve as a classification of that particular series of tokens. For example, the CLS token may provide a label associated with a given set of frames comprising a portion of the video, such as "driving car," "drinking alcohol," "shooting," etc.

The transformer may generally perform multi-head self-attention between vectors to establish temporal connections between the vectors. This provides connections between frames included in a sequence of frames (such as the sequence of frames 504) rather than relying on separate information for individual frames to perform modifications to the frames.

The first neural network 502 may also be trained using a first loss function 514, which may be a mean square error loss function. That is, the transformer 510 is trained on pairs of data (e.g., sequence of frames, ground truth labels). After training, the transformer 510 is capable of determining the value of the labels for each new input image sequence.

The first loss function 514 may receive as an input the one or more output vectors 512 produced by the transformer 510 and may determine an amount of error associated with the information included within the one or more output vectors 512. To this end, the image condition embeddings included within the one or more output vectors 512 may be compared to ground truth data. The ground data may include manually-generated labels that include image conditions present in the sequence of frames 504. As an example of a ground truth label, label "L" for frame "F" has five dimensions. The first dimension indicates the overall level of blurriness, the second dimension indicates whether motion blur exists, the third dimension indicates whether there are particle effects, the fourth dimension indicates whether there are transparency effects, the fifth dimension indicates the level of camera overexposure. A trained human labeler may observe the input frame F and manually assign the values to label L according to elements present in the frame. In some instances, the ground truth may also be generated automatically by a separate system or device.

The image condition embeddings produced at the end of the network may contain more dimensions than ground truth labels. The extra dimensions may embed information which is useful for the conditional GAN in the downstream task. When calculating loss, we take only the dimensions which correspond to manually labeled labels and compare those to the ground truths. The extra dimensions are learned via unsupervised training.

Once one or more vectors 512 are produced by the first neural network 502, the one or more vectors 512 are provided to the second neural network 550 along with the sequence of frames 504. The second neural network 550 may be a conditional GAN that uses the image condition embeddings within the one or more vectors 512 produced by the first neural network 502 to perform different levels of super resolution and photo recovery on the sequence of frames 504 to produce modified frames 560. For example, the image condition embeddings may indicate that a first frame includes intentional blurriness, so the second neural network 550 may only upscale the resolution for some of the frames (or none of the frames). However, the image condition embeddings may not include such an indication for a second frame, so the second neural network 550 may upscale the resolution of the entire second frame. Adjusting the resolution of the frames is merely exemplary and any other types of modifications to the frames may also be performed as well.

Similar to the first neural network 502, the sequence of frames 504 may also be provided to an encoder 552 associated with the second neural network 550.

The second neural network may also be associated with one or more loss functions. For example, the second neural network may be associated with a second loss function 562. The second loss function 562 may be used to further train the second neural network to produce more accurate modified frames 560. The second loss function 562 may be used to determine pixel loss in the modified frames 560. For example, the pixel loss (for example, L1 loss, MSE loss, and/or any other type of loss) may be determined by comparing the modified frames 560 to ground truth data. The ground truth data may be manually modified versions of the input frames 504 that represents the desired modifications to the input frames 504 based on the one or more vectors 512. Thus, if there are variations in the modified frames 560 produced by the second neural network and the ground truth data, the variations may be identified by the second loss function 562. The second loss function 562 may then provide an indication of the variations to the second neural network to train the second neural network.

In one or more embodiments, a third loss function 564 may also be used to train the second neural network. The third loss function 564 may be a discriminator, which is a type of classifier in a GAN. The third loss function 564 may be used to determine whether the modified frames 560 produced by the second neural network appear to be "photorealistic" or modified frames. Generally, the third loss function 564 may be used to distinguish between real data and data produced by the second neural network. Thus, the third loss function 564 may be used to train the second neural network to produce modified frames 560 that the third loss function 564 is unable to distinguish from "photorealistic" frames (e.g., the third loss function 564 is unable to determine that the second neural network produced by the modified frames 560). In some instances, the discriminator used to calculate GAN loss may be a sequence discriminator that takes the modified frames 560 as an input and outputs a value of 0 or 1. The third loss function 564 may also indicate whether the modified frames 560 were produced by the second neural network in any other suitable manner (for example, other integer values, a percentage likelihood, Boolean values, etc.).

Figure 6:
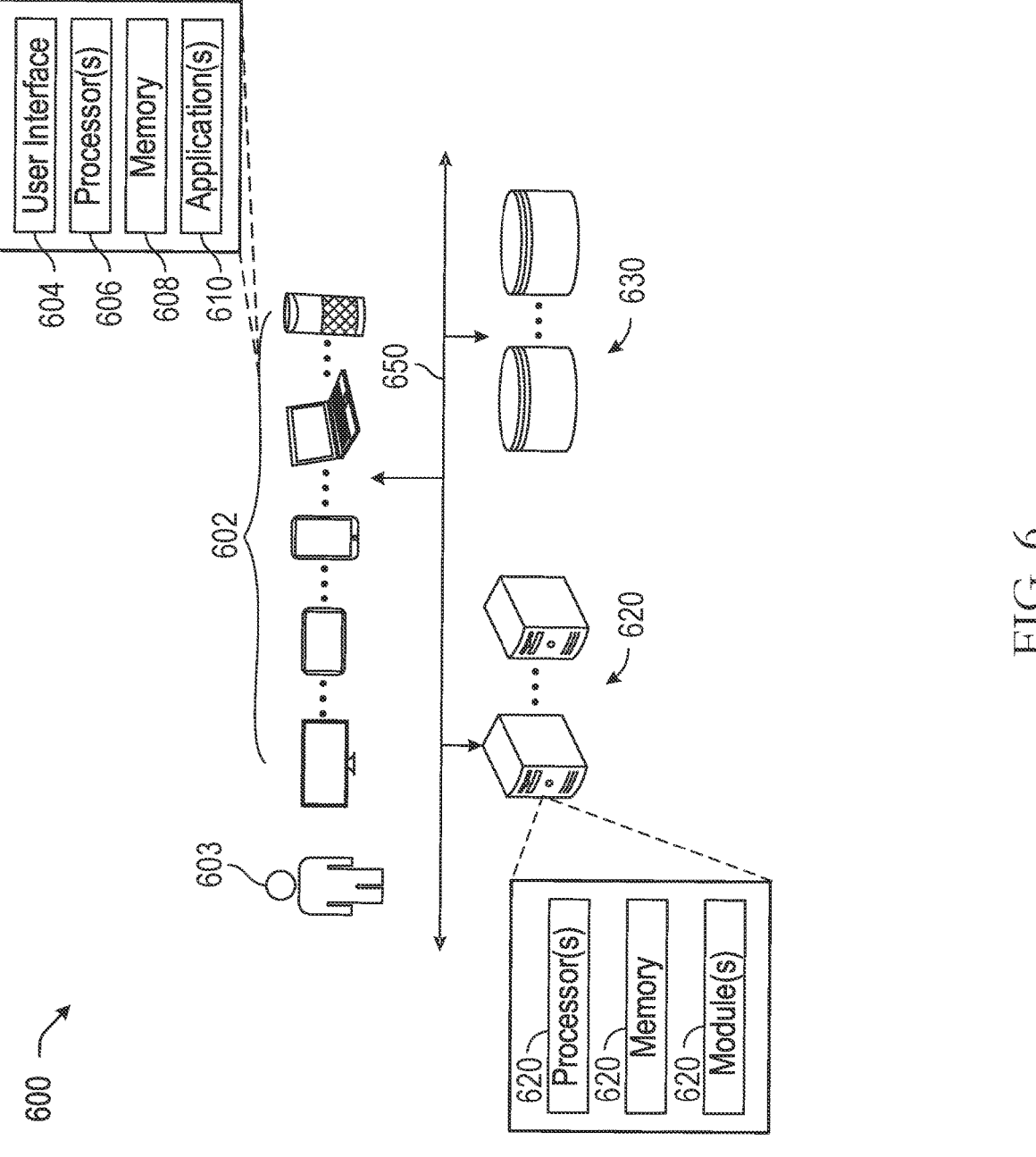
FIG. 6 is an example system for deep learning-based image and video modifications in accordance with one or more example embodiments of the disclosure.

FIG. 6 is an example system 600 for deep learning-based image and video modifications in accordance with one or more example embodiments of the disclosure. In one or more embodiments, the system may include one or more mobile devices 602 (which may be associated with one or more users 603), one or more computing devices 620, and/or one or more databases 630. However, these components of the system 600 are merely exemplary and are not intended to be limiting in any way. For simplicity, reference may be made hereinafter to a mobile device 602, computing device 620, database 630, etc., however, this is not intended to be limiting and may still refer to any number of such elements.

The mobile device 602 may be any type of device, such as a smartphone, desktop computer, laptop computer, tablet, and/or any other type of device. The mobile device 402 may include an application 610 that may allow a user 603 to perform certain functions described herein.

The computing device 620 may be any type of device or system (such as a local or remote server for example) used to perform any of the processing described herein. For example, the computing device may host any of the neural networks described herein, such as the first neural network 502, the second neural network, etc. Thus, some or all of the processing described herein may be performed at the computing device 620. The computing device 620 may also include one or more processors 606 and memory 608. Any of this processing may also be performed by the mobile device 602 and/or any other device or system described herein as well.

The database 630 may store any of the data that is used as described herein. For example, the database 630 may store ground truth data used to train any of the neural networks described herein, an input data (for example, images and/or video content) that is to be modified, and/or any other types of data.

In one or more embodiments, any of the elements of the system 600 (for example, one or more mobile devices 602, one or more computing devices 620, one or more databases 630, and/or any other element described with respect to FIG. 6 or otherwise) may be configured to communicate via a communications network 650. The communications network 650 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 650 may have any suitable communication range associated therewith and may include, for example, global networks (e.g., the Internet), metropolitan area networks (MANs), wide area networks (WANs), local area networks (LANs), or personal area networks (PANs). In addition, communications network 620 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more mobile devices 602, one or more computing devices 620, and/or one or more databases 630) of the system 600 may include any of the elements of the computing device 600 as well.

Figure 7:
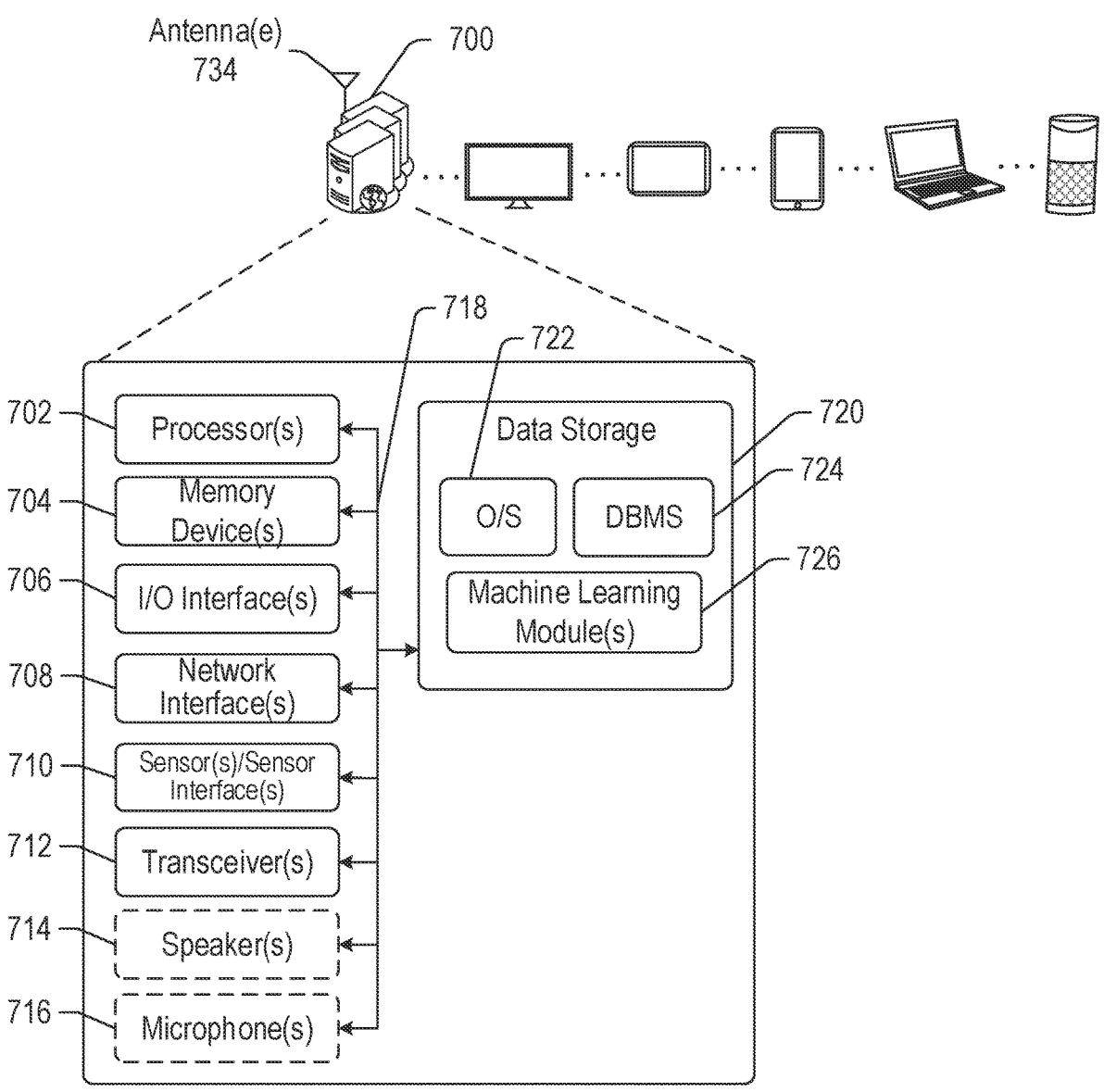
FIG. 7 is an example computing device in accordance with one or more example embodiments of the disclosure.

FIG. 7 is a schematic block diagram of an illustrative computing device 700 in accordance with one or more example embodiments of the disclosure. The computing device 700 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 700 may correspond to an illustrative device configuration for the devices of FIGS. 1-6.

The computing device 700 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The computing device 700 may further include one or more buses 718 that functionally couple various components of the computing device 700. The computing device 700 may further include one or more antenna (c) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the computing device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the computing device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more deep learning module(s) 726, one or more communication module(s) 728, one or more content scanning module(s) 730, and/or one or more prediction module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the computing device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, purchase history information, user action information, user profile information, a database linking search queries and user actions, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the computing device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the deep learning module(s) 726 may include computer-executable instructions, code, or the like that responsive to execution by one or more of the processor(s) 702 may perform functions including, but not limited to, performing any functionality associated with the first neural network, the second neural network, and/or any other functionality associated with performing modification of images and/or video content as described herein.

Referring now to other illustrative components depicted as being stored in the data storage 720, the O/S 722 may be loaded from the data storage 720 into the memory 704 and may provide an interface between other application software executing on the computing device 700 and hardware resources of the computing device 700. More specifically, the O/S 722 may include a set of computer-executable instructions for managing hardware resources of the computing device 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 700 is a mobile device, the DBMS 724 may be any suitable light-weight DBMS optimized for performance on a mobile device.

Referring now to other illustrative components of the computing device 700, the input/output (I/O) interface(s) 706 may facilitate the receipt of input information by the computing device 700 from one or more I/O devices as well as the output of information from the computing device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna (e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 700 may further include one or more network interface(s) 708 via which the computing device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna (e) 734 may include any suitable type of antenna depending, for example, on the communications protocols used to transmit or receive signals via the antenna (c) 734. Non-limiting examples of suitable antennas may include directional antennas, non-directional antennas, dipole antennas, folded dipole antennas, patch antennas, multiple-input multiple-output (MIMO) antennas, or the like. The antenna (c) 734 may be communicatively coupled to one or more transceivers 712 or radio components to which or from which signals may be transmitted or received.

As previously described, the antenna (e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (c) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b. 802.11g. 802.11n), 5 GHz channels (e.g., 802.11n, 802.11ac), or 60 GHz channels (e.g., 802.11ad). In alternative example embodiments, the antenna (e) 734 may be configured to transmit or receive radio frequency signals within any suitable frequency range forming part of the unlicensed portion of the radio spectrum.

The antenna (c) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna (e) 734—transmitting or receiving radio frequency (RF) signals in the bandwidth and/or channels corresponding to the communications protocols utilized by the computing device 700 to communicate with other devices. The transceiver(s) 712 may include hardware, software, and/or firmware for modulating, transmitting, or receiving—potentially in cooperation with any of antenna (e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computing device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computing device 700 may include alternate and/or additional hardware, software, or firmware components beyond those described or depicted without departing from the scope of the disclosure. More particularly, it should be appreciated that software, firmware, or hardware components depicted as forming part of the computing device 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by a first neural network, a sequence of frames of a video, the sequence of frames including at least a first frame and a second frame, wherein the first frame and the second frame are initially rendered at a lower resolution;
determining, by the first neural network, a first video information embedding for the first frame, wherein the first video information embedding includes an indication of at least one of: that a resolution modification is to be performed to the first frame or a modified resolution for the first frame;
determining, by the first neural network, a second video information embedding for the second frame, wherein the second video information embedding includes an indication that the second frame includes an intentional effect including at least one of: intentional blurriness, varied level of transparency, an intended lighting artifact, or a particle effect;
outputting, by the first neural network and to a second neural network, one or more vectors including the first video information embedding and the second video information embedding;
receiving, by the second neural network, the one or more vectors;
determining, by the second neural network and based on the first video information embedding for the first frame and the second video information embedding for the second frame, that the first frame is to be upscaled to an increased resolution and the second frame is to remain at a same resolution to prevent the intentional effect from being diminished or removed from the second frame by the upscaling;
modifying, by the second neural network, the first frame to produce a modified first frame at the increased resolution; and
outputting, by the second neural network, the modified first frame and the second frame.

2. The method of claim 1, further comprising:
receiving, by a first loss function, the one or more vectors;
determining a comparison between the first video information embedding and the second video information embedding and ground truth data; and
training the first neural network based on the comparison.

3. The method of claim 1, further comprising:
receiving, by a second loss function, the modified first frame;
outputting, by the second loss function, and indication of a likelihood that the modified first frame was produced by the second neural network; and
training the second neural network based on the indication.

4. The method of claim 1, further comprising:
receiving, by a third loss function, the modified first frame;
determining a second comparison between the modified first frame and ground truth image data; and
training the second neural network based on the second comparison.

5. A method comprising:
receiving, by a first neural network, first image data and second image data, wherein the first image data is associated with a first video frame and the second image data is associated with a second video frame;
determining, by the first neural network, a first classification for the first image data and a second classification for the second image data, wherein the second classification indicates that the second video frame includes an intended effect;
receiving, by a second neural network, the first image data, the second image data, the first classification for the first image data, and the second classification for the second image data;
determining that modifying the second video frame would remove or diminish the intended effect;
determining, by the second neural network and based on the first classification for the first image data and the second classification for the second image data, a first type of modification to perform to first image data instead of the second image data based on the determination that modifying the second video frame would remove or diminish the intended effect; and outputting, by the second neural network, the second image data and third image data including the first type of modification.

6. The method of claim 5, wherein the first type of modification includes an increase in a resolution of the first image data.

7. The method of claim 5, wherein the first image data is a first frame of a video and the second image data is a second frame of a video.

8. The method of claim 5, further comprising:

receiving, by the first neural network, third image data;

determining, by the first neural network, a third classification for the third image data;

receiving, by the second neural network, the third image data and the third classification for the third image data;

determining, by the second neural network and based on the third classification for the third image data, a second type of modification to perform to third image data; and outputting, by the second neural network, fourth image data including the second type of modification, wherein the first type of modification is different than the second type of modification.

9. The method of claim 5, wherein the first classification includes an indication of at least one of: that a resolution modification is to be performed to the first image data, a modified resolution for the first image data, that the first image data includes intentional blurriness, that the first image data includes varied level of transparency, that the first image data and/or the second image data includes an intended lighting artifact, and that the first image data includes a particle effect.

10. The method of claim 5, further comprising:

receiving, by a first loss function, the first classification and the second classification;

determining a comparison between the first classification and the second classification and ground truth data; and training the first neural network based on the comparison.

11. The method of claim 5, further comprising:

receiving, by a second loss function, the third image data;

outputting, by the second loss function, and indication of a likelihood that the third image data was produced by the second neural network; and training the second neural network based on the indication.

12. The method of claim 5, further comprising:

receiving, by a third loss function, the third image data;

determining a second comparison between the third image data and ground truth image data; and training the second neural network based on the second comparison.

13. A system comprising:

memory that stores computer-executable instructions; and one or more processors configured to access the memory and execute the computer-executable instructions to:

receive, by a first neural network, first image data and second image data, wherein the first image data is associated with a first video frame and the second image data is associated with a second video frame;

determine, by the first neural network, a first classification for the first image data and a second classification for the second image data, wherein the second classification indicates that the second video frame includes an intended effect;

determine that modifying the second video frame would remove or diminish the intended effect;

receive, by a second neural network, the first image data, the second image data, the first classification for the first image data, and the second classification for the second image data;

determine, by the second neural network and based on the first classification for the first image data and the second classification for the second image data, a first type of modification to perform to first image data instead of the second image data based on the determination that modifying the second video frame would remove or diminish the intended effect; and output, by the second neural network, the second image data and third image data including the first type of modification.

14. The system of claim 13, wherein the first type of modification includes an increase in a resolution of the first image data.

15. The system of claim 13, wherein the first image data is a first frame of a video and the second image data is a second frame of a video.

16. The system of claim 13, wherein the one or more processors are further configured to execute the computer-executable instructions to:

receive, by the first neural network, third image data;

determine, by the first neural network, a third classification for the third image data;

receiving, by the second neural network, the third image data and the third classification for the third image data;

determine, by the second neural network and based on the third classification for the third image data, a second type of modification to perform to third image data; and output, by the second neural network, fourth image data including the second type of modification, wherein the first type of modification is different than the second type of modification.

17. The system of claim 13, wherein the first classification includes an indication of at least one of: that a resolution modification is to be performed to the first image data, a modified resolution for the first image data, that the first image data includes intentional blurriness, that the first image data includes varied level of transparency, and that the first image data includes a particle effect.

18. The system of claim 13, wherein the one or more processors are further configured to execute the computer-executable instructions to:

receive, by a first loss function, the first classification and the second classification;

determine a comparison between the first classification and the second classification and ground truth data; and train the first neural network based on the comparison.

19. The system of claim 13, wherein the one or more processors are further configured to execute the computer-executable instructions to:

receive, by a second loss function, the third image data;

output, by the second loss function, and indication of a likelihood that the third image data was produced by the second neural network; and train the second neural network based on the indication.

20. The system of claim 13, wherein the one or more processors are further configured to execute the computer-executable instructions to:

receive, by a third loss function, the third image data;

determine a second comparison between the third image data and ground truth image data; and train the second neural network based on the second comparison.

\* \* \* \* \*